March 31, 1931.     A. C. HARDY     1,799,134
MECHANICAL INTEGRATING DEVICE
Filed Nov. 21, 1928     3 Sheets-Sheet 1

Inventor:
Arthur C. Hardy,
by Charles E. Tullar
His Attorney.

March 31, 1931.  A. C. HARDY  1,799,134
MECHANICAL INTEGRATING DEVICE
Filed Nov. 21, 1928   3 Sheets-Sheet 2

Inventor:
Arthur C. Hardy.
by Charles E. Muller
His Attorney.

March 31, 1931.   A. C. HARDY   1,799,134
MECHANICAL INTEGRATING DEVICE
Filed Nov. 21, 1928    3 Sheets-Sheet 3

Inventor:
Arthur C. Hardy
by Charles V. Tullar
His Attorney

Patented Mar. 31, 1931

1,799,134

UNITED STATES PATENT OFFICE

ARTHUR C. HARDY, OF WELLESLEY, MASSACHUSETTS, ASSIGNOR TO GENERAL ELECTRIC COMPANY, A CORPORATION OF NEW YORK

MECHANICAL INTEGRATING DEVICE

Application filed November 21, 1928. Serial No. 320,953.

The present invention pertains broadly to the art of comparing or measuring radiant energy (of which light, heat and electrical energy may be cited as examples) and more especially to the art of recording or registering the results of such comparison or measurement and to apparatus useful in the practice of such arts.

In its more limited aspects the invention relates to apparatus which serves to provide an indication of the effect produced by radiant energy on a receptor mechanism such as a photographic plate, a photo-electric tube or the retina of the human eye. In application Serial No. 274,729, entitled Method of and apparatus for comparing radiant energy, filed May 3, 1928, there is disclosed and claimed an improved color analyzer so-called, to which the integrating device described hereinafter is particularly well adapted although it is to be understood that the mechanical integrator which forms the subject of the present invention has application to all color analyzers in general when suitable and obvious changes are embodied therein.

The color analyzer provides information concerning the composition of the radiant energy. In a specific embodiment, in the case of a reflecting specimen, the results can be expressed by means of a curve showing the reflecting power at each wave length in the spectrum. This may be called the objective measurement of a color.

The effect of radiant energy upon a receptor mechanism, such as a photographic plate or the human retina, depends on both the spectral composition of the radiant energy and on the spectral sensitivity of the receptor mechanism. In a simple case, exemplified by a photographic plate, the total effect produced by a definite amount of radiant energy can be computed by multiplying together the corresponding ordinates of a curve showing the spectral energy distribution of the source and the spectral sensitivity of the photographic plate. The result of this process is a curve, the area under which is a measure of the total effect produced on the plate.

In the same way the visual brightness of a source can be computed by multiplying its energy distribution curve by corresponding ordinates of the visibility or visual response curve for the human retina; the area under the resulting curve is then a measure of the apparent brightness of the source. Although it is possible to compute graphically in the manner outlined, the effect produced by radiant energy of a given spectral composition, the process is exceedingly tedious and time consuming. The present invention relates to an attachment to a color analyzing instrument which performs mechanically the same operation that would otherwise be done graphically but accomplishes the result in a fraction of the time. For example, the instrument described in application Serial No. 274,729 referred to above, requires less than a minute for a complete spectral analysis. By the addition of the mechanical integrating attachment to be described hereinafter, the effect of radiant energy of this spectral composition can be computed while the energy is being measured, the result being available immediately at the completion of the color analysis.

Although the examples just cited are convenient for the purpose of illustration, one of the most important applications for this attachment is in the numerical specification of a color sensation. The color analyzer gives in the form of a curve a complete specification of a color in the objective sense. The subjective effect of a color stimulus can best be described in terms of the degree of excitation of the three primary receptor mechanisms, which experiment has shown the human eye to contain. By a suitable arrangement of this attachment the degree of stimulation of the violet, green and red receptor mechanisms may be computed during the progress of the analysis of the color stimulus.

The attachment conveniently may include one or more rotating dials or index wheels one for each of the receptor mechanisms in the case of the human retina or a single dial in the case of the photographic plate, the dial mechanism being arranged to make the respective computations and to translate the results directly into numerical figures which collectively become a measure of the total effect produced by the color stimulus on any assumed receptor mechanism. The dial mechanism preferably is controlled by the movement of cams which are actuated by the color analyzer.

Some of the objects of the present invention are to provide a mechanical device which has ready adaptation to color analyzers and which will serve automatically and accurately to combine the spectral analysis findings of the analyzer with various other spectral data and to specify the response of any light-sensitive element such as a photographic plate or the human retina to radiation of known energy distribution; to provide a device of this character which will be simple to operate and simple to build and in general, to improve the art of recording or registering the total qualitative effects produced on a plurality of light sensitive surfaces by a single light source, or sources of equal intensity and quality. Other objects and features will be apparent as the specification is perused in connection with the accompanying drawings in which Fig. 12 graphically illustrates the relative spectral sensitivity of the three primary receptor mechanisms, violet, green and red, of the human retina when exposed to an equal energy spectrum; while

In the interests of clarity and logical sequence the specification will proceed first with a detailed description of an exemplary form of color analyzer such as disclosed and claimed in the prior application referred to and afterwards, a complete description of the mechanical integrating attachment which forms the subject matter to the present invention.

Figures 1, 8:
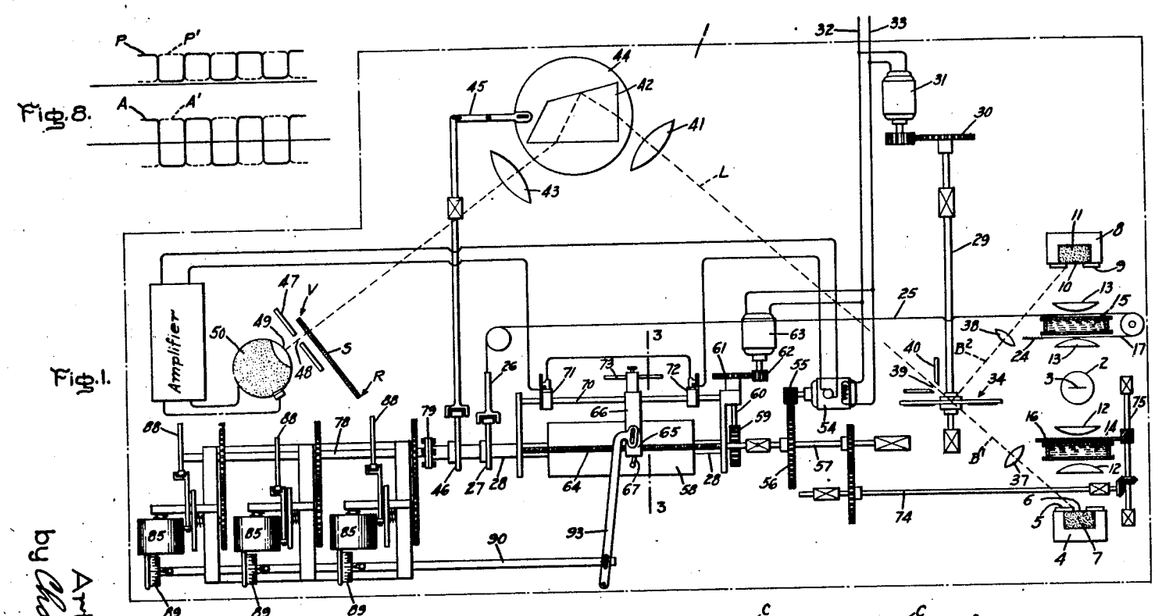
Fig. 1 is a diagrammatic plan view illustrating a combined color analyzer and a mechanical integrating mechanism.
Fig. 8 is a diagram illustrating the shift in phase of an alternating current resulting from the reversal of the relative intensity of light from the standard and sample.

Referring to the drawings, particularly Fig. 1, the numeral 1 designates a suitable base which is here shown as carrying the various elements of the apparatus, together with the wiring forming the electrical circuits. Upon the base 1 is mounted a light source 2, conveniently an incandescent lamp, preferably having a flat filament 3 which is disposed in the plane indicated in Fig. 1. At one side of the lamp 2 is provided a support 4 adapted to hold a sample to be tested or a standard of comparison although it is illustrated as holding the latter. This support preferably is provided with a shield 5 having an aperture through which the substantially flat vertical surface 6 of the standard 7 is exposed to the light of the lamp.

At the opposite side of the lamp 2, and conveniently at the same distance from the lamp as the support 4, is mounted a second support 8, provided with a shield 9 having a slit or aperture through which the surface 10 of the test sample 11 is exposed to the light from the lamp.

Between the lamp and the support 4 is preferably arranged a set of condensing lenses 12 and a similar set of lenses 13 is arranged between the lamp and the support 8. In order to avoid overheating the sample and the standard, there are interposed cooling cells 14 and 15 at suitable points between the lamp and the respective supports. There is also interposed a pair of shutter or diaphragm devices 16 and 17 between the lamp and the supports 4 and 8 respectively, said shutters being adapted to shut off more or less of the light from the lamp and thus to determine the relative amount of light reflected from the exposed surfaces of the standard and sample. The purpose of each of the shutter devices will be pointed out in greater detail hereinafter.

Figures 3, 4, 5, 6, 7:
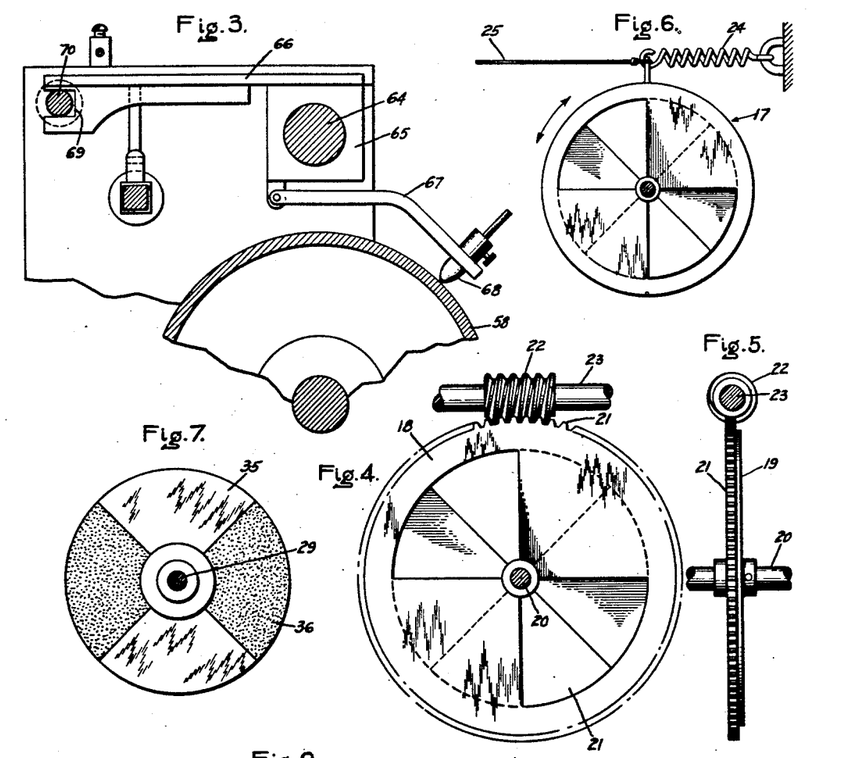
Fig. 3 is a fragmentary, enlarged vertical section substantially on the line 3—3 of Fig. 1.
Fig. 4 is a fragmentary front elevation illustrating shutter means for controlling the intensity of the illumination of the standard.
Fig. 5 is an edge elevation of the device shown in Fig. 4.
Fig. 6 is a front elevation of a compensatory shutter means for controlling the illumination of the sample.
Fig. 7 is a front elevation of the flash-producing disk with its shaft in section.

Referring to Figs. 4 and 5 there is shown the shutter device 16 in detail, it being understood that the shutter device 17 may be of generally similar character. The shutter 16 comprises a pair of disk-like plates 18 and 19 respectively, mounted upon a stationary shaft 20 carried by suitable brackets, not shown, on the base 1, the shaft 20 being parallel to and substantially spaced from the axis of the lenses 12 and 13. The plate or disk 18 is free to turn on the shaft 20 while the disk or plate 19 is fixed to the shaft and thus remains stationary. Each of the plates or disks 18 and 19 is preferably provided with alternating opaque and transparent sectors. These sectors may conveniently be formed by punching out the material of the plates so as to leave openings 21 alternating with sectors which are not punched out. By turning the plate 18 relatively to the plate 19, the open sectors may be brought into registry, thus permitting a maximum amount of light to pass through the shutter device. On the other hand, by adjusting the plate properly, the registering portions of the open sectors may be diminished in area until, if desired, the opening is completely closed. The plate 18 is furnished with gear teeth 21 which mesh with a worm 22 on a rotary shaft 23 mounted in suitable bearings carried by the base 1. The means for rotating this shaft 23 is hereinafter more fully described.

The movable plate or disk of the shutter device 17 preferably is provided with an arm to which there is connected a spring 24 which tends to rotate the movable plate or disk in a given direction, for example, so as to provide the maximum aperture through the shutter device. A flexible cord 25, or other suitable connecting element connects the arm with a cam follower 26 (Fig. 1) which is actuated by a cam 27 on a shaft 28 hereinafter more fully described. By suitably shaping the cam 27 the shutter device 17 may be adjusted in one direction or the other at such varying speeds as may be desired.

There is arranged a shaft 29 in suitable bearings carried by the base 1, the shaft being aligned substantially parallel to the optical axes of the lenses 12 and 13, that is to say, substantially perpendicular to the planes of the exposed surfaces 6 and 10 of the standard and test sample respectively. The shaft 29 is provided with a gear 30 meshing with a pinion upon the shaft of a synchronous electric motor 31 which is connected by suitable lead wires to the mains 32 and 33 which are furnished with alternating current of predetermined and substantially uniform period (for example, sixty cycles per second) from any suitable source.

The shaft 29 carries a flashing device 34 conveniently consisting of a disk of glass or other suitable material having alternating transparent sectors 35 and reflecting sectors 36, as shown in Fig. 7. The reflecting surfaces of the sectors are turned toward the light reflected from the test sample 11 and the plane of the disk is so located that it makes substantially equal angles with beams of light $B^1$ and $B^2$ reflected, respectively, from the surfaces 6 and 10 of the standard 7 and sample 11. For properly directing these beams of light toward the disk, there is interposed lenses 37 and 38 in such beams. When a transparent sector 35 of the flasher disk 34 is properly positioned the beam $B^1$ of light reflected from the standard 7 passes through the lens 38 and through such transparent sector and thence through a narrow vertical slit 39, on which it is focused, in a shield 40 mounted upon the base and along the path L. When the beam from the standard is passing through the flasher disk, the beam $B^2$ from the sample also passes in the opposite direction through the disk, but without any useful effect. On the other hand, when the disk is positioned with its reflecting sector 36 in the path of the beam $B^2$, the latter is reflected and passes along the same path L as that which the beam $B^1$ formerly traversed. At this time, however, the latter beam is shut off by the opaque reflecting sector 36 so that only light from the sample 11 passes along the path L. The revolution of the shaft 29 with its disk 34 thus causes light reflected from the standard 7 and from the test sample 11 to pass in alternate flashes through the slit 39 along the path L.

The speed of the motor 31 and the gear ratio between the motor shaft and the shaft 29 is such that the alternations of light flashes from the standard and sample is at the same rate as the period of alternation of the electric current in the mains 32 and 33, that is to say, if sixty-cycle current be employed, flashes will be delivered by the disk 34 at the rate of 60 flashes per second from each.

These alternating flashes of light next pass through a lens 41 and into a prism 42, which disperses the light to form an extended spectrum band S. Preferably there is interposed a lens 43 in the path of the light emerging from the prism, the red end of the spectrum band being indicated at R and the violet end at V.

The prism may be mounted upon a rotary support 44 which may be slowly adjusted, either continuously or step by step, by means of suitable connections 45 actuated by a cam 46 on the shaft 28 already referred to. This adjustment of the support 44 with the dispersing device has the effect of shifting the position of the spectrum band S in a longitudinal direction.

A shield 47 is fixedly mounted upon the base 1 and this shield has a narrow aperture 48 adapted to permit light from the spectrum band (of a limited range of wave length) to pass through and enter the window 49 of a photo-electric cell 50.

With the arrangement described, rotation of the shaft 28 with its cam 46 swings the support 44 and thus shifts the position of the spectrum band S, with the result that the cell 50 is progressively exposed to light of varying wave length, beginning, for example, at one end of the spectrum band and slowly progressing, either continuously or intermittently, to the other end of the spectrum band. If, at any given wave length of light, the luminous energy received by the cell from the standard be greater than that received from the sample, for example, or vice versa, a fluctuation or pulsation in the current in the photoelectric cell is produced, and as the flashes of light from the standard and sample alternate at a determined rate, the current in the photoelectric cell will have a similar rate of pulsation, and such pulsations will continue so long as there is any difference in intensity of luminous energy in successive flashes of light delivered to the cell. When the luminous energy from the sample and standard as delivered to the cell becomes equal, the current in the latter ceases to pulsate. The current in the photoelectric cell may thus be employed to indicate differences or equality in the intensity of light delivered from the standard and sample at any given wave length, but since the current in the photoelectric cell is extremely small, for example, of the order of $10^{-10}$ amperes, such current is of little value, either for observational purposes or for directly actuating any mechanical device, and accordingly there is provided means for amplifying this current. For amplifying this current it is preferred to employ thermionic tubes or equivalent devices of well-known character, connected in suitable circuits as shown, for example, in Fig. 2 where there are indicated three amplifier stages $A^1$, $A^2$ and $A^3$. To avoid leakage over the surface of the photoelectric cell 50, the latter may be provided with a guard ring 51 of metal, connected into the amplifier circuit substantially as shown. Preferably condensers C and X are employed in the amplifier circuits, said condensers being so designed that only current of approximately sixty cycles is amplified, current of substantially higher or lower frequency being by-passed or blocked, respectively.

Figure 2:
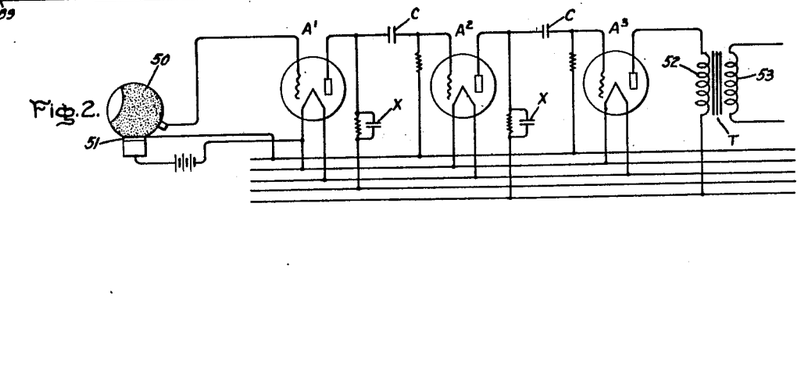
Fig. 2 is a diagram illustrating one arrangement of the amplifier circuits useful in connection with the apparatus of Fig. 1.

The plate circuit of the amplifier $A^3$ includes the primary 52 of a transformer T whose secondary 53 is connected by suitable lead wires to a reversible motor 54. As here shown, the current from the secondary of the transformer is fed to the rotor of the motor and the field of this motor is supplied with alternating current from the mains 32 and 33. The shaft of the motor 54 carries a pinion 55 meshing with a gear 56 on the shaft 57 which, as above described, actuates the movable element of the shutter device 16 and thus, as the motor turns in one or the other direction, the shutter is opened or closed.

The shaft 28, previously referred to, is mounted to turn in bearings supported by the base 1 and this shaft carries a record drum 58 which may support a wax cylinder, a sheet of paper, or other surface adapted to receive a record. As above described, the shaft 28 also carries the cams 27 and 46 for actuating the shutter 17 and for moving the dispersing device 42 so as to expose the photoelectric cell progressively to different parts of the spectrum band.

The shaft 28 is provided with a gear 59 meshing with a worm, not shown, on a shaft 60, carrying a gear 61 meshing with a pinion 62 on the shaft of an electric motor 63 which receives alternating current from the mains 32 and 33. The shaft 57 is provided with a screw-threaded portion 64 engaging a nut member 65 forming part of a reciprocating carriage 66 which supports a lever 67 (Fig. 3) overlying the surface of the drum 58 and carrying a stylus 68 or other suitable element adapted to cooperate with the drum or a piece of paper mounted thereon in producing a record.

As shown in Fig. 3, the reciprocating carriage is provided with rearwardly and downwardly extending support portions one of which has a slot 69 which receives a metallic guide rod 70 fixedly secured in insulating supports on the base member 1. The rod 70 preferably supports circuit breakers 71 and 72, respectively, which are disposed adjacent to opposite ends of the drum 58; these circuit-breaking devices are connected in circuit with the motor 54, above described. Each circuit-breaking device comprises normally engaging contacts, one contact of each circuit-breaker being movable and disposed in the path of a rod 73 mounted on the carriage, so that if the carriage approaches too near to one end or the other of the drum, the rod will engage the corresponding circuit breaker and thus break the circuit through the motor, thus avoiding accidental over-travel of the carriage.

In the operation of the device, the standard 7 (which, as above stated, is conveniently a block of magnesium carbonate ($MgCO_3$) having a smooth vertical face 6) is mounted on the support 4 and the sample to be tested is mounted on the support 8 with its surface 10 exposed through the slit in the shield 9. The lamp 2 is now lighted and its light passes in opposite directions through the condensing lenses 12 and 13 and illuminates the standard 7 and the sample 11. The light reflected from the surfaces 6 and 10 passes through the lenses, and, as the disk 34, rotates, this light is despatched in alternating flashes along the path L through the lens 41 to the dispersing device 42. After dispersion, the light passes through the lens 43 and forms a spectrum band at S, such band consisting of alternating spectra formed by the dispersion of the alternating flashes of light from the standard and sample. As indicated in Fig. 1, the support 44 is, for the moment, so adjusted that the violet end of the spectrum is opposite the slit 48, so that the photoelectric cell is exposed only to the violet component of light reflected from the standard and sample.

Assuming, for example, that the photoelectric cell is exposed at the red end of the spectrum and that the shutters 16 and 17 are so adjusted that a greater amount of red light is reflected from the standard than from the sample, the energy represented by the flashes from the standard will be greater at the red end of the spectrum than the energy of the flashes from the sample. Thus, the photo-electric cell 50 will be subject to alternating variations in energy, and a pulsating current will be set up in this cell. Referring to Fig. 8 the line P diagrammatically indicates the character of this pulsating current in the photoelectric cell and it is to be remembered that the period of this current is identical with the period of alternation of the current supplied to the mains 32 and 33, due to the fact, as above described, that the flasher disk is driven by the motor 31 through a definite and predetermined gear ratio. The pulsating current from the cell 50 is amplified by means of the amplified device above referred to, and flows through the primary 52 of the transformer T as an amplified pulsating current of the same period as the original current in the cell. This pulsating current, flowing in the primary of the transformer, induces alternating current of like period in the secondary 53 of the transformer, this alternating current being indicated diagrammatically at A in Fig. 8. The alternating current from the transformer T is delivered to the rotor of the motor, and assuming that this alternating current in the rotor is of the same phase as the alternating current in the field of the motor, the motor shaft will be driven in a certain predetermined direction.

Assuming that the apparatus is properly designed and that the red component of light from the standard is greater than that from the sample, as above suggested, the rotation of the motor 54 turns the shafts 74 and 75 (Fig. 1) in such a direction as gradually to close the shutter 16, thus cutting off some of the light from the standard 7 and at the same time moving the carriage 66 longitudinally of the rotating drum 58 and causing the stylus 68 to impress a record mark upon the drum or upon a piece of paper carried by the drum. This movement of the motor 54, the shafts, the stylus and the shutter 16 continues until so much light has been cut off from the standard that, at that particular part of the spectrum under observation, light of equal intensity is received by the photoelectric cell from the standard and sample. As soon as this condition of balance is attained, the current in the cell immediately ceases to pulsate, whereupon amplification ceases and alternating current is no longer induced in the secondary of the transformer. The rotor of the motor 54 is now no longer supplied with current and this motor stops.

When the motor 54 stops, the motor 63 continues to turn the drum 58 and the shaft 28, thus turning the cam 46 and moving the support 44 to a new position. The support 44, after stoppage of the motor 54, is immediately moved so as to shift the relative position of the spectrum band S with respect to the photo-electric cell, thus exposing the cell to a new part of the spectrum. If at this new position the light from the standard and source be of different intensity, the above sequence of operations again takes place and if, under these new circumstances, the light from the standard still is more intense than that from the sample, the motor 54 will again move in the same direction, thus further closing the shutter 16.

Assuming, however, that in the new position of the photo-electric cell the light from the sample is the more intense, a pulsating current will again be set up in the photo-electric cell, but by reason of the fact that the light from the sample is reflected from the surfaces of the disk which are 90° removed from those sectors of the disk which transmit light from the standard, the phase of the pulsations in the photoelectric cell will be shifted, as indicated diagrammatically, for example at $P^1$ in Fig. 8. This shift in phase of the pulsating current in the photo-electric cell results in a corresponding shift of phase in the alternating current in the secondary of the transformer T, this change being indicated diagrammatically at $A^1$ in Fig. 8. Since the phase of the alternating current in the field of the motor 54 remains unchanged, this shift of phase in the rotor current immediately results in reversal of the motor. This reversal of the motor 54 causes the shaft 57 to turn in the opposite direction from that previously described, thus moving the carriage 66 in the opposite direction along the drum and at the same time gradually opening the shutter 16. This action continues until light from the standard as delivered to the photoelectric cell, is of the same intensity as that from the sample, whereupon the current in the cell again ceases to pulsate and the motor 54 stops.

The above operations are repeated with great rapidity as the photoelectric cell is progressively exposed from one end of the spectrum band to the other, and although this sequence of operations be repeated a great many times, for example, several hundred during the progression of the photoelectric cell from one end of the spectrum to the other, the entire operation may be completed in a period of the order of one minute. The combined movement of the drum 58 and the stylus 68 produces a curve upon the drum, or the paper mounted thereon, of the form indicated in Fig. 10 wherein the curves are of the general appearance produced by testing samples of a dominant yellow hue and a dominant blue hue respectively.

For the reason that the reflecting power of the silvered surfaces of the disk 34 varies somewhat at different portions of the spectrum, there is provided the adjusting device comprising the shutter 17 and the cam 27 for actuating it,—the cam being designed to compensate for the irregularly varying reflection values of the silvered surface at the different parts of the spectrum.

Figure 9:
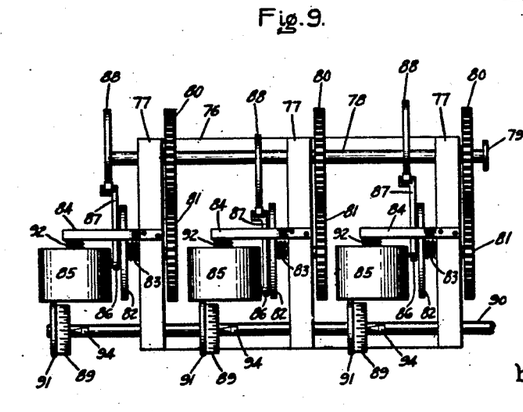
Fig. 9 is a top plan view of the mechanical integrating attachment.

The mechanical integrating attachment which forms the subject matter of the present invention consists of a double U-shaped frame 76 (see Figs. 1 and 9), the lower portion or base of which is secured in any suitable manner to the main base 1. The frame terminates in a plurality of uprights 77, each of which carry one of the indicating or registering mechanisms; the latter are individually operated and register their angular displacement by means of a dial arrangement described hereinafter. The mechanism for operating each dial consists essentially of a shaft 78 which is rotated at a constant angular velocity through a complete revolution, a single revolution marking the completion of the examination through the spectrum range by the photo-electric cell 50 of the light rays reflected by the sample and standard specimens. In practice, this shaft conveniently may be connected to the shaft 28 of the color analyzer by a suitable form of coupling 79 thereby deriving the same angular movement as the record drum; the shaft 78 carries a plurality of gears 80 which mesh with the other gears 81 rotatably mounted on the frame 76 by means of stub shafts (not shown). At the end of each stub shaft remote from the gear, there is secured a circular plate member 82 and between the plate member and each upright, a compression spring 83 is positioned. Attached to each frame upright, there is a curved transversely extending member 84 broadly in the form of a horse-shoe which carries at its free end a drum 85 adapted to rotate and to be frictionally driven by the plate member 82 through a small rotating disk 86. This disk is attached to the free end of a reciprocating arm which derives its motion by means of a cam follower 87 from one of the cams 88 secured to the shaft 78. Each of the drums 85 is mounted in frictional contact with an index wheel or dial 89 preferably marked in parts of a hundred and which is free to rotate on a shaft 90 carried by the frame. In order to ensure no slippage between the drum and index wheel the latter may carry a shoulder or projecting rim 91 which, if desired, may constitute frictional material and moreover a steady force may be applied to the drum by means of a compression spring 92. The shaft 90 is adapted to move in a direction parallel to its axis but not to rotate, the longitudinal motion being imparted thereto by the reciprocating carriage 66 (see Fig. 1) of the color analyzer which moves over the recording drum 58. A motion-reducing linkage 93 advantageously may be employed to transmit the reciprocatory motion of the carriage to the shaft 90. The latter has affixed thereto a series of aligned pointers 94, one each for the respective dials which serves to indicate the amount of angular travel made by the index wheel 89 during a complete revolution of the cam shaft 78 and hence during the time a complete spectral analysis is being made.

Figure 10:
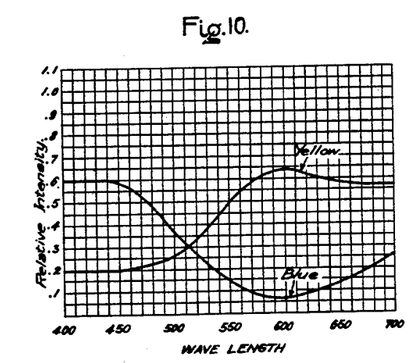
Fig. 10 shows a graph such as may be produced on the record drum of the color analyzer depicting, as an objective measurement, relative reflecting powers of two samples which exhibit predominantly yellow and blue sensations respectively.
Figure 11:
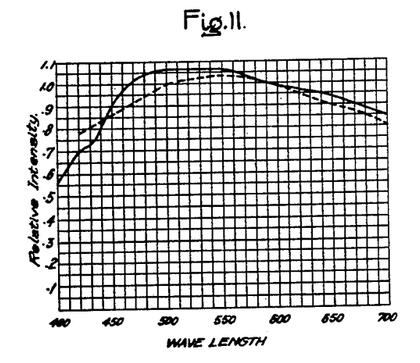
Fig. 11 shows a graph which illustrates the spectral composition of two widely employed illuminants, the full line curve representing average noon sunlight and the dotted line artificial sunlight as produced by special forms of lamps.
Figure 12:
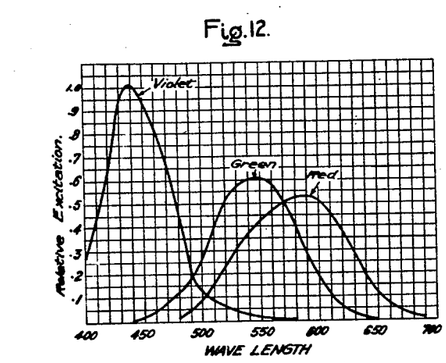

Now, it has been pointed out that in order to obtain a numerical specification of a color sensation received by the eye, it is necessary to multiply the energy distribution curve of the light in question by the corresponding ordinates of the relative excitation curves for the receptor mechanisms of the human retina. It is apparent that the reciprocatory movement of the carriage 66 along the rotating drum 58 defines a curve, examples of which are shown in Fig. 10, and having an area which is a direct measure of the energy distribution of the light source under observation. It follows that the relative movement between the carriage 66 and drum 58 is also a measure of this same quantity which relative movement is carried to the integrating attachment by the combined rotary and reciprocatory efforts of shafts 78 and 90. The other factors in the determination of the sensation produced by a color stimulus, besides the energy distribution or spectral composition of the light source as found by the color analyzer, are the color response of the retina describable by the three elementary excitation functions which may be assumed to be characterized by the curves shown in Fig. 12 and also the spectral energy distribution of the viewing light which distribution may be graphically depicted by either of the curves shown in Fig. 11. The full line curve in Fig. 11 represents the spectral energy distribution of natural sunlight as measured at noon and the other in dotted line, the energy distribution of one kind of artificial sunlight. Fig. 12 shows the normal elementary color excitations of a human retina, i. e. the sensitivity of the three primary receptor mechanisms of the eye, violet, green and red, with respect to light of various visible wave lengths. It is apparent that if the sample surface is white and has a reflecting power of standard or unity value then the product of each of the color excitation ordinates of Fig. 12 by the corresponding ordinates of the full line spectral distribution curve shown in Fig. 11 gives rise to three curves when plotted against wave length the areas under which are an indication of the degree of stimulation of the primary receptor mechanisms by the sample in question as viewed in noon sunlight. It is further apparent that the full line curve of Fig. 12 is representative of the spectral composition of all other illuminants.

It will be understood that the assumptions made in the preceding paragraph with respect to the energy distribution of the illuminant and the spectral sensitivity of the receptor mechanism are entirely separate and apart from the results obtained by the color analyzer. The results given by the latter are purely objective and it now remains to indicate the method by which the integrating attachment computes the subjective effect from the objective measurement utilizing the assumed values. This mechanical integrating attachment constitutes the subject of the present invention and is designed to combine, in an accurate and quick manner, the objective findings of the analyzer with the assumed subjective factors, thereby mechanically to register the sensation produced on the eye by a color stimulus. It is apparent that two quite different materials in the objective sense might give rise under proper conditions to the same subjective sensation. In other words, these two specimens would appear identical to a normal observer when viewed under the proper kind of illumination but would not appear to match under any other kind of illumination. Similarly, two samples which appear to match subjectively to a normal observer will not, in general, appear to match to a color blind observer if they are objectively different. By the use of the present color analyzer and integrating attachment a person with a defective color vision is enabled to match and specify colors in terms of the sensation produced on a normal observer.

It will be noted that the assumed subjective factors unlike that of the reflecting power of the various specimens tested, are not subject to incessant change inasmuch as they involve the factor of normal or standard vision in the case of the human retina, also the factor of a universal or standard illuminant such as sunlight and as such the combined effect of the subjective factors as a product lends itself readily to execution in permanent cam form. It has been explained heretofore that the attachment receives a combined reciprocatory and rotary motion from the color analyzer, which combined motion is a direct measure of the spectral composition of the surface 10 of the sample under examination. In order to combine with the composite motion in a product relation, a movement which would represent the product of each of the violet, green and red excitation curves with the spectral composition of the illuminant, the cams 88 are designed to move the respective followers a distance comparable to each of the respective products. It will be noted that as each follower proceeds about the periphery of each respective cam the distance each disk 86 moves from the center of the uniformly rotating plate 82 is constantly changing with the result that the speed of rotation of each of the drums 85 is varied. The dials 89 are in frictional contact with the drums 85 and hence, they also have a variable speed of rotation. Each dial, in addition to the movement just described is subject to another form of displacement, namely the reciprocatory motion of the shaft 90 which tends to move the dials away from the center of the revolving drums 85 the same distance, which distance is a measure of the ordinates of the spectral composition curve of the sample surface 10 as found by the color analyzer and as illustratively exemplified by the curves shown in Fig. 10. As the position of the contact rim of each dial moves from center of the drum 85, its peripheral velocity is correspondingly varied so that each dial registers in terms of a composite angular displacement, the reciprocatory movements of the respective cam followers and also that of the shaft 90. The relation of the dial angular displacement to each of these movements is obviously that of a product to one of its factors.

Figure 13:
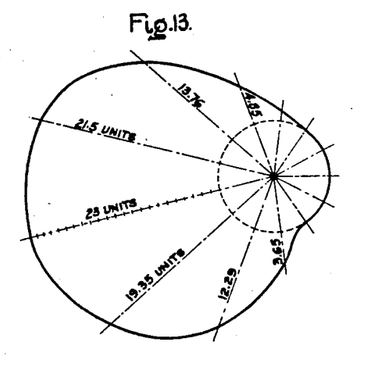
Fig. 13 is an outline of a cam which imparts a rotary effort in accordance with a specified function or with the product of functions to one of the index or dial mechanisms.

Fig. 13 shows an enlarged outline view of one of the cams and as stated hereinbefore the function of each cam is to move the follower through a series of distances which are proportional to the ordinates of each excitation characteristic; this characteristic represents the product of one of the excitation curves shown in Fig. 12 and the spectral composition curve of the viewing illuminant shown in Fig. 11. While the cam arrangement consists in as many independently operating cams as there are primary excitation functions or receptor mechanisms to be considered, each cam calling for a different design, it will be sufficient to illustrate the manner of designing one of the cams and for this purpose the cam which operates the index wheel for indicating the amount of red sensation is selected. The following catalogue is self explanatory in so far as the values taken from the various curves are concerned:

| Wave length λ | Length of ordinate spectral composition curve Fig. 11 of illuminant | Length of ordinate red excitation curve Fig. 12 | Product of columns Nos. 2 and 3 | Distance in units from zero periphery to outside periphery of cam |
|---|---|---|---|---|
| Column No. 1 | Column No. 2 | Column No. 3 | | |
| 400 | .56 | 0 | 0 | (43×0) = 0 |
| 425 | .72 | 0 | 0 | (43×0) = 0 |
| 450 | .9 | 0 | 0 | (43×0) = 0 |
| 475 | 1.03 | 0 | 0 | (43×0) = 0 |
| 500 | 1.06 | .08 | .085 | (43×.085) = 3.65 |
| 525 | 1.06 | .27 | .286 | (43×.286) = 12.29 |
| 550 | 1.06 | .425 | .450 | (43×.450) = 19.35 |
| 575 | 1.03 | .52 | .535 | (43×.535) = 23 |
| 600 | .99 | .51 | .500 | (43×.500) = 21.5 |
| 625 | .97 | .33 | .320 | (43×.320) = 13.76 |
| 650 | .94 | .12 | .113 | (43×.113) = 4.85 |
| 675 | .9 | .03 | .027 | (43×.027) = 1.16 |
| 700 | .85 | 0 | 0 | (43×0) = 0 |
| | | | Sum = 2.316 100÷2.316 = 43 (Quotient factor) | |

It will be noted that the products of columns 2 and 3, i. e., the length of ordinates of the respective spectral composition curve of the illuminant and of the red excitation curve, as measured at the various wave lengths are added together and the sum divided into 100 giving a quotient of 43 approximately. Each of the products are then multiplied by the factor in determining the respective distances upon which to predicate the design of the cam. This mathematical procedure is for the purpose of adjusting the cam design to a condition where the index wheel, which indicates the amount of red sensation, will read the arbitrarily chosen value of 100 in the event a pure white reflecting specimen is being examined. Thus, assuming that the test specimen 11 and the standard specimen 7 are both of magnesium carbonate ($MgCO_3$) and that instead of producing a reflecting power curve as shown in Fig. 10, this characteristic becomes a substantially straight line having equal ordinates of one unit length, indicating 100 per cent reflecting power or that the reflecting power of the test specimen is equal to that of the standard specimen, it is clear that the red cam preferably should be so designed that under these conditions the aggregated movements of the index wheel which is actuated by the cam must approximate a final reading of 100 if other specimens of less reflecting power are to be rated on the basis of 100. The cam (see Fig. 13) is laid off by spacing along the lines which radiate equidistantly about the center, as many as there are wave length readings, a number of units of length dependent upon the respective products as raised to the 100 per cent basis, with proper allowance made for the zero periphery of the cam. The cams for actuating the index wheels which register the violet and green sensations are designed in a similar manner except that column 3 in these cases would show the length of the ordinates of the violet and green excitation curves respectively and the summation of the products of columns 2 and 3 obviously would be different than that shown, as also would be the quotient factor. The position of the cams 88 on the shaft 78 should of course be determined by calibration tests made upon a pure white reflecting sample and preferably checked by index readings taken upon one or more colored specimens whose color stimuli have been carefully computed from data obtained by reliable spectro-photometric measurements. The check computation which heretofore has been the accepted method of deriving the numerical specification referred to hereinbefore consists of determining either graphically or mathematically the product of the areas lying under the reflecting power curve, the illuminant spectral composition curve and each of the primary excitation curves resulting in as many products as there are primary receptor mechanisms. Upon proper design and calibration of the mechanical integrating attachment such as described, the mathematical or graphical computation is solved mechanically and accurately during the time the radiant energy is being measured, the result being available immediately at the completion of the color analysis. It is apparent that in the case of a pure white reflecting test sample, each of the violet, green and red primary receptor mechanisms will be stimulated equally and hence the index wheels should each register or be calibrated to read preferably 100. Specimens which reflect radiation energy to a less degree than the pure white substance will obviously register a different combination of numbers or percentages of the 100 per cent reflecting power, thus, a green specimen may be indicated as 20—45—18 meaning that there are 20 units of violet sensation, 45 of green and 18 of red stimulated under the assumed conditions. In the case of the photographic plate specimen, the cam dimensions should accord with the various degrees of sensitivity exhibited by the plate throughout the spectrum and the dial reading will be a measure of the effect of the radiant energy on the plate assuming that the shaft 90 may be moved longitudinally in some manner through distances dependent upon the spectral composition of the radiant energy. This reading may also be calibrated as in the previous case upon the basis of 100 if the effect of a particular plate specimen be considered 100 per cent standard.

While I have described my invention pertaining to a mechanical integrating instrument in terms of an attachment to a particular form of color analyzer, it is to be understood that the principles involved are independent of the type of mechanism which provides the longitudinal motion to the shaft 90 of the attachment and the rotary movement to the shaft 78. It is necessary for the purpose of the invention merely to obtain in any convenient manner the proper amount of the rotary motion and longitudinal movement specified in the proper correlation to define the reflecting power of a sample in order that accurate readings may be obtained from the dials. It is evident that other methods will suggest themselves to those skilled in the art, in the light of applicant's disclosure, of combining a composite motion defining a measure of the reflecting power of a sample with the motions inherent in the integrating device from which to derive, in the aggregate, a resultant motion or angular displacement which will be an accurate measure of the total effect produced by a color stimulus on a primary receptor mechanism. Moreover, while I have exemplified the design of the cam periphery as a measure of the excitation characteristic of a receptor mechanism, it is apparent that the peripheral shape may take on various forms and include various factors either as a product or simply as an integer in which case, it would be necessary to translate or modify the dial readings in accordance with the factors employed. Indeed, in practice, it is feasible to provide a plurality of sets of cams, each set being cut to account for different factors or products and identified or labelled as such. For example, when the viewing light is changed from average noon sunlight to artificial incandescent light, a set of cams designed for the latter condition may displace those designed for the noon sunlight illuminant. Little inconvenience would be experienced in making this change as the cams may be made readily replaceable, in fact, the latter may be manufactured and sold as separate articles of merchandise to fit standard forms of mechanical integrating devices. It is evident that other integrating devices might be used for the purpose of this invention, for example, by connecting the pen of the color analyzer to the slider of a potentiometer, it is possible to obtain a current in a circuit which is proportional at any instant to the reflecting power at the corresponding wave lengths. If one of the cam followers is similarly connected to the slider of a second potentiometer the current in this circuit may be made proportional to the excitation characteristics at the corresponding wave lengths. By causing these currents to flow through the coils of an integrating watt-hour meter, the reading of the meter at the completion of the curve is an indication of the total effect of the radiant energy upon the receptor mechanism. Similarly, any other device which integrates the product of two or more functions might be adapted for the purpose of this invention.

Although I prefer to attach the integrating device directly to the color analyzer, it is obvious that, if desired, the device described hereinbefore, might be adapted by suitable modification to manual operation wherein a previously determined objective measurement curve is traced by hand while the sheet on which the curve is drawn is caused to progress and at the same time to actuate suitable mechanism, for example cams.

In addition to application Serial No. 274,729 referred to hereinbefore, claims in various scope on color analyzers suitable for use in connection with the integrating attachment described herein, are contained in the Hardy application Serial No. 274,448, filed May 2, 1928, entitled "Method of and apparatus for comparing and recording radiant energy", also in the Hardy and Cunningham application Serial No. 195,848, filed June 1, 1927, and entitled "Method of and apparatus for comparing and recording relative intensity of radiant energy".

What I claim as new and desire to secure by Letters Patent of the United States, is:

1. Apparatus of the class described comprising means for determining the spectral composition of a source of radiant energy and means cooperating therewith for computing the effect of the radiant energy, as found by the said determination, upon a receptor mechanism of known spectral sensitivity.

2. Apparatus of the class described comprising means for determining the spectral composition of a source of radiant energy and means cooperating therewith for computing the effect of the radiant energy, as found by the said determination, upon a light-sensitive substance of known spectral sensitivity.

3. Apparatus of the class described comprising an integrating mechanism which includes means for determining the effect of light of known spectral composition on a material, from the spectral sensitivity of the said material.

4. A combined color analyzer and an integrating attachment including means for determining the spectral composition of a source of radiant energy, means cooperating therewith for producing an effect proportional to the product of the integrated values of the ordinates of the spectral composition curve of a given illuminant and of the integrated values of the ordinates of a predetermined spectral light excitation curve, said last mentioned means cooperating with the first mentioned means in a product relation.

5. In apparatus for indicating the total effect of a color stimulus derived from a sample on a receptor mechanism, an indicating device, means for operating the device in accordance with the variations in magnitude of the spectral light energy distribution of the color sample, also in accordance with the spectral sensitivity of the receptor mechanism whereby the indicating device registers the total effect of the color stimulus on the receptor mechanism.

6. In apparatus for indicating the total effect of a color stimulus on a receptor mechanism, which stimulus is derived by reflection from an illuminated sample, an indicating device, means for operating the device in accordance with the variations in magnitude of the spectral light energy distribution of the color sample, also in accordance with the product of the spectral values of excitation relating to the receptor mechanism by the spectral composition of the illuminant whereby the indicating device registers the total effect of the color stimulus on the receptor mechanism.

7. In apparatus for indicating the total effect of a color stimulus on a receptor mechanism, an indicating device, means for operating said device through a period of time, the duration of which is an integrated measure of the reflecting power of the sample, means for combining with this operation another operation which extends through a period of time, the duration of which is an integrated measure of the spectral sensitivity of the receptor mechanism whereby the net operation of the indicator becomes a measure of the total effect exercised by the color stimulus on the receptor mechanism.

8. Apparatus for determining the color characteristics of light reflected from an illuminated test sample, an indicating mechanism which serves to register the total effect exercised by the color stimulus of the light sample on a receptor mechanism, means for actuating the indicating mechanism in accordance with the product of the spectral reflecting power of the sample, the spectral composition of the illuminant and the spectral sensitivity of the receptor mechanism.

9. Apparatus for determining the color characteristics of light reflected from an illuminated test sample, an indicating mechanism which serves to register the total effect exercised by the color stimulus of the light sample on a receptor mechanism, means for actuating the indicating mechanism in accordance with the product of the spectral reflecting power of the sample, the spectral composition of the illuminant and the spectral sensitivity of the receptor mechanism, said means including a cam whose periphery defines the product of the spectral composition of the illuminant and the spectral sensitivity of the receptor mechanism.

10. In an apparatus for registering the numerical specification of a color sensation exhibited by a sample in terms of the degree of stimulation of each of the primary receptor mechanisms of the human retina, said apparatus comprising an index wheel for each mechanism, the readings of said wheels in the aggregate constituting the said numerical specification, means for imparting to the respective wheels an angular movement corresponding with the variations in the length of the ordinates of the respective visual response curves for each of the receptor mechanisms and means for combining with each of these angular movements another angular movement corresponding with the variations in the light of the ordinates of the curves which depicts the spectral reflecting power of the sample whereby the net angular movement of the respective index wheels represents a measure of the degree of stimulation exercised by the color on the respective receptor mechanisms.

11. In apparatus for indicating the total effect of a color stimulus of a light reflecting sample in terms of the individual stimulation of a plurality of representative primary receptor mechanisms, a plurality of indicating devices, one each for the receptor mechanisms, means for actuating each of the indicating devices in accordance with the spectral sensitivity of the respective receptor mechanisms, and means common to all of the indicating devices for applying equally to each of the indicating devices, an additional actuating force whose magnitude varies in accordance with the spectral reflecting power of the sample whereby the net actuation of each dial represents in the aggregate, the total effect of a color stimulus on the primary receptor mechanisms.

12. An attachment for a color analyzer for translating the reflecting power of a sample as determined by the color analyzer into a numerical specification which describes the color in terms of its effect upon the receptor mechanism, said attachment comprising a shaft adapted to rotate, a cam rigidly mounted on the shaft, the peripheral surface of the cam having a shape which defines the ordinate variation of the spectral sensitivity curve of the receptor mechanism, an index wheel for indicating the said specification, connecting means between the cam and the wheel for imparting to the latter an angular movement which follows the change in the length of the ordinates of the spectral sensitivity curve and means for modifying the said angular movement in accordance with the spectral variations of the reflecting power of the sample as determined by the analyzer whereby the composite movement is a direct measure of the total effect of the color stimulus of the sample on the receptor mechanism.

13. An attachment for a color analyzer for translating the reflecting power of a sample as determined by the color analyzer into a numerical specification which describes the color in terms of its total effect upon the three primary receptor mechanisms of the human retina, said attachment comprising a shaft adapted to rotate, three cams rigidly mounted on the shaft, the peripheral surface of the respective cams having a shape which defines the ordinate variation of the visual response curve for each of the respective receptor mechanisms, a plurality of index wheels for indicating the specification as a composite number, connecting means between each cam and the respective index wheels for imparting to each of the latter an angular movement which follows the corresponding changes in the length of the ordinates of the respective visual response curves and means for modifying each of said angular movements in accordance with the spectral variations of the reflecting power of the sample as determined by the analyzer whereby the composite movements of the wheels represent in the aggregate, a direct measure of the total effect of the color stimulus of the sample on the said receptor mechanisms.

14. In apparatus for indicating the total effect of a color stimulus derived by reflection from a sample on a receptor mechanism, an index wheel for registering the said total effect, a shaft adapted to rotate, a cam rigidly mounted on the shaft whose peripheral surface has a shape which defines the variations of the spectral sensitivity of the receptor mechanism, said index wheel being rotatably mounted on a shaft which is adapted to move longitudinally, connecting means between the cam and the index wheel for actuating the latter in accordance with the variations of the cam surface, said last-mentioned means comprising a plate adapted to rotate, a cam-follower rod which terminates in a disk in frictional contact with the said plate whereby the cam causes the disk to move across the plate thereby to vary the peripheral velocity of the disk, a cylindrical drum adapted to rotate, the peripheral surface of the drum being in frictional contact with the disk, the end of the drum being in frictional contact with the index wheel whereby the latter is actuated through a distance which represents the integrated values of the spectral sensitivity of the receptor mechanism, means for actuating the shaft which is adapted to move longitudinally in accordance with the integrated values of the spectral reflecting power of the sample whereby the angular movement imparted to the index wheel represents the resultant of the movements derived from the cam and also derived from the means which actuates the wheel in accordance with the spectral reflecting power of the sample.

In witness whereof, I have hereunto set my hand this 20th day of November, 1928.

ARTHUR C. HARDY.